(12) United States Patent
Köstler et al.

(10) Patent No.: US 11,541,748 B2
(45) Date of Patent: Jan. 3, 2023

(54) TANK SYSTEM

(71) Applicant: Hamm AG, Tirschenreuth (DE)

(72) Inventors: Gerd Köstler, Tirschenreuth (DE);
Stefan Reber, Weiden (DE); Armin Landstorfer, Mitterteich (DE)

(73) Assignee: Hamm AG, Tirschenreuth (DE)

( * ) Notice: Subject to any disclaimer, the term of this patent is extended or adjusted under 35 U.S.C. 154(b) by 127 days.

(21) Appl. No.: 17/104,113

(22) Filed: Nov. 25, 2020

(65) Prior Publication Data
US 2021/0170864 A1 Jun. 10, 2021

(30) Foreign Application Priority Data
Dec. 6, 2019 (DE) ...................... 10 2019 133 272.9

(51) Int. Cl.
*B60K 15/077* (2006.01)
*B60K 15/03* (2006.01)
*E02F 9/08* (2006.01)

(52) U.S. Cl.
CPC .. *B60K 15/077* (2013.01); *B60K 2015/03217* (2013.01); *B60K 2015/03236* (2013.01); *B60K 2015/03243* (2013.01); *B60K 2015/0777* (2013.01); *E02F 9/0883* (2013.01)

(58) Field of Classification Search
CPC ........ B60K 15/077; B60K 2015/03217; B60K 2015/03236; B60K 2015/03243; B60K 2015/0777; E02F 9/0883
USPC .......................................... 280/834; 123/509
See application file for complete search history.

(56) References Cited

FOREIGN PATENT DOCUMENTS

| DE | 10 2009 049 799 | | 4/2011 | |
| --- | --- | --- | --- | --- |
| DE | 102009049799 | | 4/2011 | |
| DE | 102013011665 | | 1/2015 | |
| DE | 202014010518 | | 11/2015 | |
| DE | 102016014881 | A1 * | 7/2017 | ............. F02M 37/04 |
| DE | 102016009228 | | 2/2018 | |
| EP | 2343446 | | 7/2011 | |
| EP | 2628623 | | 8/2013 | |
| EP | 3470253 | A1 * | 4/2019 | ............. B60K 15/03 |
| WO | 2014/148986 | | 9/2014 | |
| WO | 2018/210105 | | 11/2018 | |
| WO | 2018210105 | | 11/2018 | |

OTHER PUBLICATIONS

European Search Report issued in EP 20205346, dated Feb. 9, 2021.

* cited by examiner

*Primary Examiner* — Mahmoud Gimie
(74) *Attorney, Agent, or Firm* — Rankin, Hill & Clark LLP

(57) ABSTRACT

A tank system for a construction machine includes a fuel tank having an outer tank wall that closes off a tank volume to the outside, a withdrawal tank volume, which is separated by a partition wall from a main tank volume of the tank volume and has a fuel-exchanging connection to the main tank volume, and a fuel withdrawal arrangement having a main fuel pump and a withdrawal line opening into the withdrawal tank volume for conveying fuel by the main fuel pump via the withdrawal line from the withdrawal tank volume to a fuel-consuming system region. The tank system also includes a fuel feed arrangement having an auxiliary fuel pump for conveying fuel from the main tank volume into the withdrawal tank volume.

15 Claims, 3 Drawing Sheets

TANK SYSTEM

The present invention relates to a tank system, in particular for a construction machine, comprising a fuel tank having a tank outer wall that closes off a tank volume to the outside, a withdrawal tank volume, which is separated by a partition wall from a main tank volume of the tank volume and has a fuel-exchanging connection to the main tank volume, and a fuel withdrawal arrangement having a main fuel pump and a withdrawal line opening into the withdrawal tank volume for conveying fuel by means of the main fuel pump via the withdrawal line from the withdrawal tank volume to a fuel-consuming system region.

Such a tank system is known from DE 10 2013 011 665 A1. The tank volume of a fuel tank of this known tank system is divided by two bulkheads into a withdrawal tank volume delimited by these two bulkheads and a main tank volume separated by the two bulkheads from the withdrawal tank volume. Since the two bulkheads extend in the vertical direction over only a portion of the tank volume starting from a bottom wall of a tank outer wall of the fuel tank, the withdrawal tank volume has a fuel-exchanging connection to the main tank volume at the top. Furthermore, return valves are provided in the bulkheads, which permit fuel to flow from the main tank volume into the withdrawal tank volume, but prevent a flow of fuel out of the withdrawal tank volume into the main tank volume. A withdrawal line of a fuel withdrawal arrangement opens into the withdrawal tank volume, so that a fuel pump can convey the fuel contained in the tank volume from the withdrawal tank volume in the direction toward a fuel-consuming system region, for example an internal combustion engine used as a drive assembly.

It is the object of the present invention to provide a tank system, in particular for a construction machine, which ensures a withdrawal of fuel from a fuel tank of the tank system unimpaired by an inclination of the tank system.

According to the invention, this object is achieved by a tank system, in particular for a construction machine, comprising:
- a fuel tank having a tank outer wall that closes off a tank volume to the outside,
- a withdrawal tank volume, which is separated by a partition wall from a main tank volume of the tank volume and has a fuel-exchanging connection to the main tank volume,
- a fuel withdrawal arrangement having a main fuel pump and a withdrawal line opening into the withdrawal tank volume for conveying fuel by means of the main fuel pump via the withdrawal line from the withdrawal tank volume to a fuel-consuming system region.

The tank system according to the invention is distinguished by a fuel feed arrangement having an auxiliary fuel pump for conveying fuel from the main tank volume into the withdrawal tank volume.

In contrast to the arrangement known from the prior art, in which the withdrawal tank volume is passively filled by fuel flowing from the main tank volume therein, in the structure according to the invention, the auxiliary fuel pump actively conveying fuel from the main tank volume into the withdrawal tank volume ensures that independently of the inclination with which the tank system is positioned, for example in working operation of a construction machine, and therefore also independently of a feed of fuel requiring the action of gravity into the withdrawal tank volume, fuel is fed into the withdrawal tank volume so that a suitable filling of the withdrawal tank volume is ensured and therefore operating phases cannot arise in which the main fuel pump at least temporarily cannot convey fuel in the direction toward a fuel-consuming system region, for example an internal combustion engine, due to a lack of filling of the withdrawal tank volume.

In order to ensure that a region is always provided in the withdrawal tank volume which contains fuel independently of the fill level of the tank volume, in particular fuel which is conveyed by means of the fuel auxiliary pump into the withdrawal tank volume, it is proposed that the withdrawal tank volume comprise a lower withdrawal tank volume region with respect to a vertical direction and an upper withdrawal tank volume region adjoining the lower withdrawal tank volume region in the vertical direction, wherein the lower withdrawal tank volume region is separated from the main tank volume in such a way that there is no direct fuel-exchanging connection between the main tank volume and the lower withdrawal tank volume region.

Reliable, uninterrupted withdrawal of fuel from the withdrawal tank volume by means of the main fuel pump can be ensured here if the withdrawal line opens into the withdrawal tank volume in the region of the lower withdrawal tank volume region.

The avoidance of a direct fuel-exchanging connection between the main tank volume and the lower withdrawal tank volume region can be ensured, for example, in that the lower withdrawal tank volume region is positioned in the vertical direction essentially completely under a bottom wall of the tank outer wall in the region of the main tank volume.

To feed fuel from the main tank volume into the withdrawal tank volume, the fuel feed arrangement can comprise a first feed line opening into the main tank volume and leading from the main tank volume to the auxiliary fuel pump and a second feed line opening into the withdrawal tank volume and leading from the auxiliary fuel pump to the withdrawal tank volume. It can be provided here that the second feed line opens into the withdrawal tank volume in the region of the upper withdrawal tank volume region.

To additionally be able to provide a purification function during the feeding of fuel from the main tank volume into the withdrawal tank volume, it is proposed that a fuel filter be arranged in the region of the first feed line.

To additionally be able to provide a further increased level of security against a state unsuitable for a withdrawal of fuel due to strongly inclined positioning of the tank system, it is proposed that the tank volume be divided by at least one intermediate wall into a first tank volume region containing the withdrawal tank volume and a second tank volume region having a fuel-exchanging connection to the first tank volume region. Such a division also ensures in particular that sloshing movements of the fuel contained in the tank volume induced due to movements of the tank system or a construction machine including it or the like essentially cannot have the result that the feeding of fuel from the main tank volume into the withdrawal tank volume is impaired.

It is then preferably provided that the first feed line opens into the main tank volume in the region of the first tank volume region.

In particular, if all of the fuel conveyed by the main fuel pump from the withdrawal tank volume in the direction toward a fuel-consuming system region is not consumed in this system region, it is advantageous if a return feed line, which opens into the tank volume, is provided for the return feed of fuel conveyed by means of the main fuel pump from the withdrawal tank volume into the tank volume, wherein the return feed line opens into the tank volume in the region of the withdrawal tank volume.

According to one particularly advantageous aspect of the present invention, it can furthermore be provided that the fuel feed arrangement is designed to alternately feed fuel into the withdrawal tank volume or to the fuel-consuming system region. This enables, in particular if a defect occurs in the region of the main fuel pump and it can no longer be used in a suitable manner for conveying fuel, the fuel-consuming system region still to be fed with fuel by means of the auxiliary fuel pump of the fuel feed arrangement, for example to still be able to move a construction machine equipped with such a tank system at least to a workshop.

According to a further advantageous aspect, it is proposed that the fuel feed arrangement is designed to permanently operate the auxiliary fuel pump during a delivery mode of the main fuel pump. Good mixing of the fuel contained in the tank volume with fuel which is not consumed by a fuel-consuming system region and is therefore conducted back into the tank volume, and which generally has an elevated temperature, is thus ensured at all times by a permanent delivery mode or the circulating mode provided by the auxiliary fuel pump. The settling of contaminants in the tank volume is also prevented.

The invention furthermore relates to a construction machine, in particular a soil compactor, comprising a tank system constructed according to the invention.

A fusion of functions can be achieved in such a construction machine in that a part of the tank outer wall provides an outer shell of the construction machine.

To provide the largest possible tank volume, it is proposed that the tank volume comprise an essentially central tank volume region with respect to a machine transverse direction and lateral tank volume regions on both sides of the central tank volume region with respect to a machine longitudinal direction.

The central tank volume region can essentially be provided by the first tank volume region here, and the lateral tank volume regions can essentially be provided by the second tank volume region.

To introduce fuel into the tank find without interference with other system regions, for example a drive assembly of the construction machine, occurring at the same time, a filling opening for filling fuel in the tank volume can be open to one of the lateral tank volume regions.

The invention furthermore relates to a method for operating a tank system constructed according to the invention, for example in a construction machine constructed according to the invention, wherein the auxiliary fuel pump is operated to convey fuel from the main tank volume into the withdrawal tank volume if an item of fill level information provided by a sensor system indicates that the fill level in the withdrawal tank volume is too low.

Using this method, it can be ensured that the auxiliary fuel pump is actually only operated if this is also actually required due to a fuel level being too low in the region of the fuel tank from which the fuel is withdrawn. In states in which there is a sufficient fill level and this is accordingly also indicated by the fill level information, the operation of the auxiliary fuel pump can thus be omitted. If a sensor system providing sensor signals to be used as the basis for the fill level information is not provided, the auxiliary fuel pump can be permanently operated, i.e., whenever the main fuel pump is also operated.

The present invention is described in detail hereinafter with reference to the appended figures. In the figures.

Figure 1:
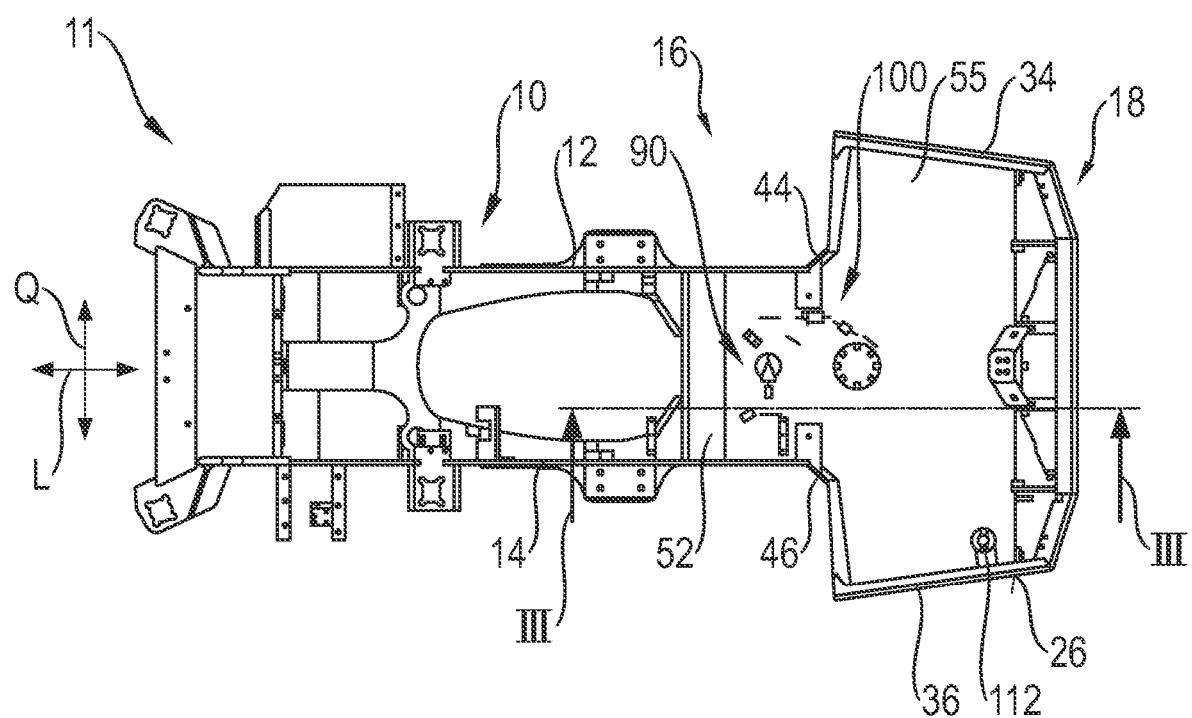
FIG. 1 shows a top view of a part of a machine frame of a construction machine, for example a soil compactor.
Figure 2:
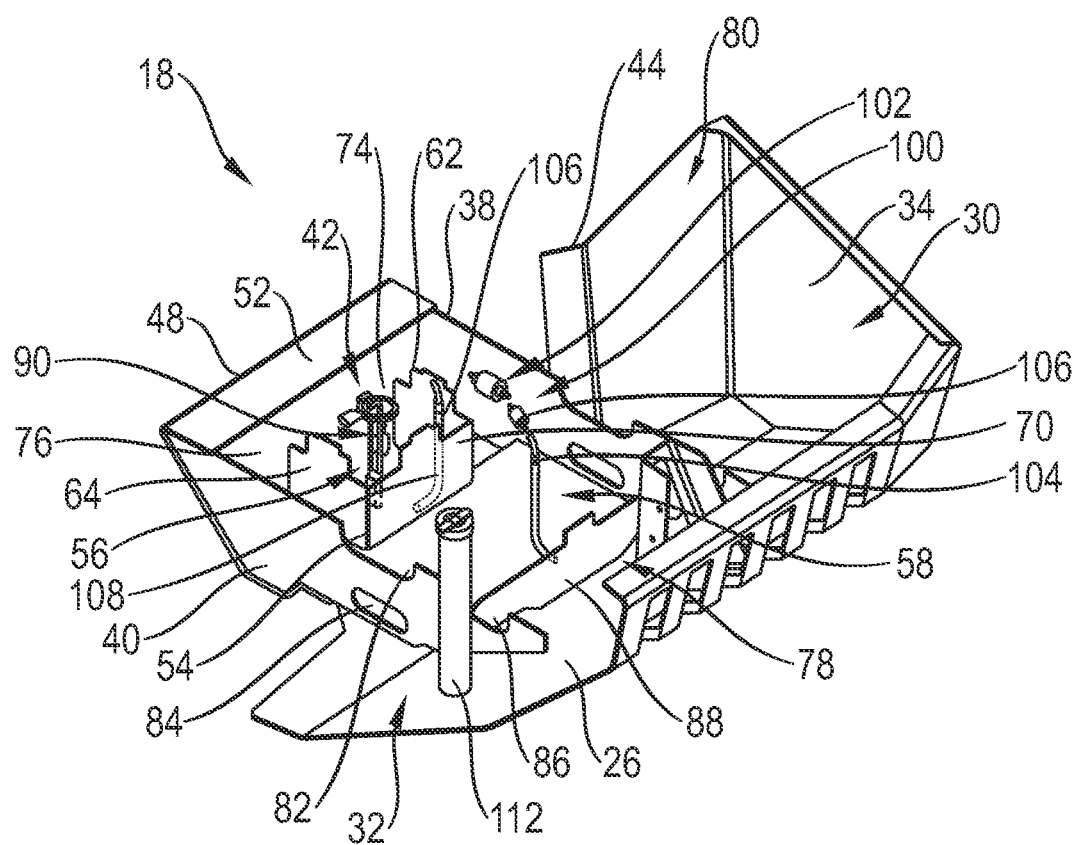
FIG. 2 shows a perspective and partially open view of a rear region provided on the machine frame of FIG. 1 having a tank system.

The machine frame 10 shown in a top view in FIG. 1 forms the rear region of a machine frame of a construction machine 11, for example a soil compactor, on which, for example a drive assembly, in particular a diesel internal combustion engine, and the drive wheels to be driven by such a drive assembly and positioned on both sides of the machine frame 10 are provided. The machine frame 10 comprises longitudinal members 12, 14 which extend in a machine longitudinal direction L and run at a distance from one another in a machine transverse direction Q, having side walls facing away from one another. In a rear region 16 of these two longitudinal members 12, 14, which can be connected to one another by various crossbeams, of course, a tank system 18 described in greater detail hereinafter of the construction machine 11 constructed using the machine frame 10 is provided.

The tank system 18 comprises a fuel tank identified in general by 20, the tank volume 22 of which is closed to the outside by a tank outer wall 24. The tank outer wall 24 comprises an outer shell 26 which provides a rear apron in a rear region of the construction machine 11 and which essentially provides a bottom wall 28 and lateral tank volume areas 30, 32, which are also described below, towards the outside or also walls 34, 36 which rise in a laterally delimiting manner. Multiple reinforcing struts 37 can be fixed, for example by welding, on a wall section 35 of the outer shell 26 originating from the bottom wall 28 and rising to the rear and diagonally upward, in order to reinforce the outer shell 26 in this region exposed to the outside.

The tank outer wall 24 furthermore comprises two intermediate walls 38, 40 essentially connected to the bottom wall 28 of the outer shell 26, which delimit a central tank volume region 42 between them, which is arranged essentially centrally on the machine frame 10 or in the construction machine 11 in the machine transverse direction Q. The two side walls 34, 36 can be connected to the intermediate walls 38, 40 in their regions adjoining the intermediate walls 38, 40 using wall sections 44, 46 angled towards a front region of the machine frame 10, for example by welding and thus liquid-tight.

An outer wall part 48 adjoining the bottom wall 28 of the outer shell 26 adjoins the bottom wall 28 in its front end region 50 and encloses end regions of the intermediate walls 38, 40, which are oriented in the direction toward a front region of the machine frame 10 and taper outward in a wedge shape, for example, also using a wall section 52 positioned on the upper side of the intermediate walls 38, 40.

A plate-like tank cover 55, which closes off the tank volume 22 in a vertical direction V on top, is connected to these parts or system regions permanently and in a liquid-tight manner by welding in its regions adjoining the wall section 52, the intermediate walls 38, 40, and the outer shell 26.

The front end regions of the intermediate walls 38, 40, which are essentially enclosed by the outer wall part 48, are accommodated in the machine frame 10 between the two longitudinal members 12, 14 and are thus also located with the outer wall part 48 at least partially in the interior of the machine frame 10, so that these regions do not provide any part of the outwardly visible shell of the machine frame 10 or the construction machine 11.

An essentially U-shaped partition wall 54 is provided in the interior of the fuel tank 22. This delimits, with the outer wall part 48, a withdrawal tank volume 56 and separates it from the remaining part of the tank volume 22 generally referred to as the main tank volume 58. The withdrawal tank volume 56 can fundamentally be divided into two regions indicated by a dashed line S in FIG. 3. This is, on the one hand, a lower withdrawal tank volume region 60 located below the dashed line S, which is laterally delimited by U-legs 62, 64 of the U-shaped partition wall 54 and downwards and to the front and back by a wall section 66 of the outer wall part 48 adjoining the bottom wall 28 of the outer shell 26. Above the dashed line S, there is an upper withdrawal tank volume region 68, which is delimited to the side and in the direction to the rear by the U-legs 62, 64 or a connecting section 70 of the partition wall 54, however to the front or between the front end edges of the U-legs 62, 64 and an upwardly rising wall section 72 of the outer wall part 48, it is open via lateral or wedge-shaped openings 74, 76 to the main tank volume 58. The upper withdrawal tank volume region 68 is also open toward the main tank volume 58 in the upper edge region of the partition wall 54.

Figure 3:
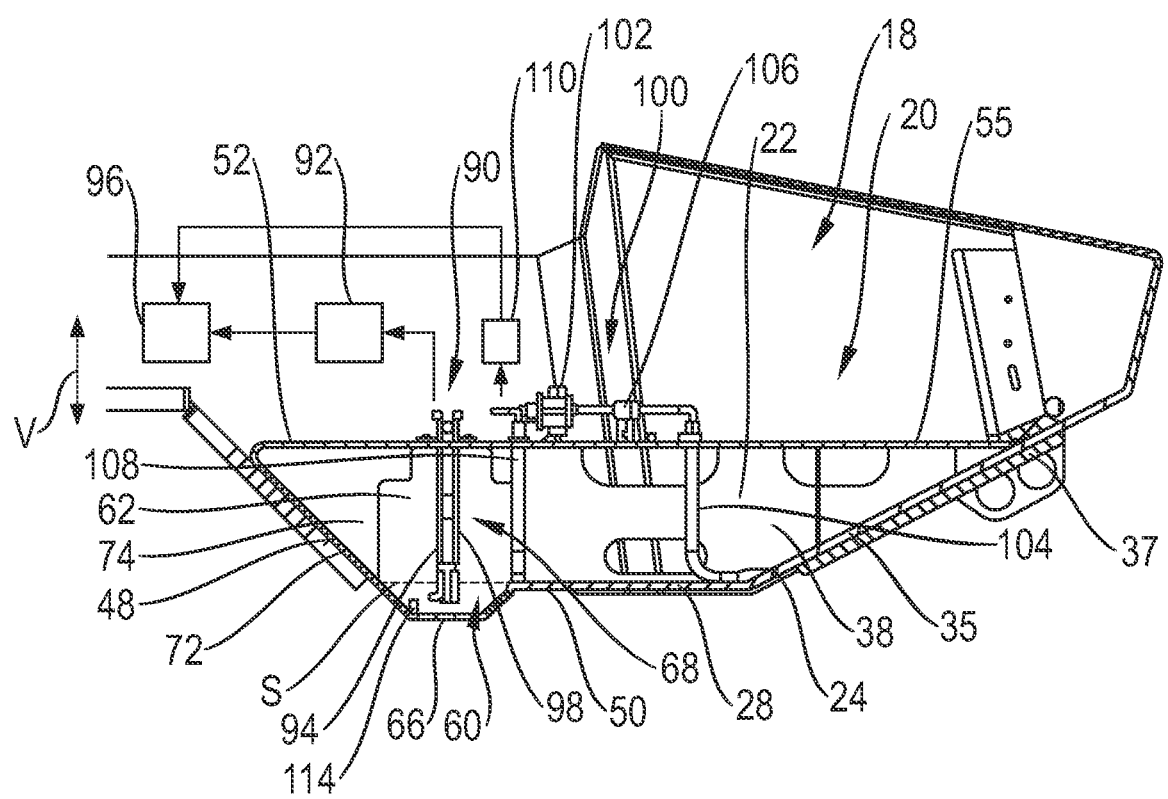
FIG. 3 shows a partial longitudinal sectional view of a tank system in section along a line III-III in FIG. 1.

It is apparent in FIG. 3 that the lower withdrawal tank volume region 60, which does not have a direct fuel-exchanging connection to the main tank volume 58, but rather provides a closed trough downward and laterally or to the front, essentially lies below the level provided by the bottom wall 28. It is thus ensured that even with minimal fill level of the fuel tank 20 and essentially non-inclined positioning of the tank system 18, as illustrated in FIG. 3, fuel will always collect in the lower withdrawal tank volume region 60. If the rear region of the tank system 18, i.e., the right region in FIG. 3, is inclined downward, the partition wall 54 prevents the fuel present in the lower withdrawal tank volume region 60 from running out. If the tank system 18 is inclined downward in the front, all of the fuel present in the tank volume 22 will collect in the front region of the fuel tank 22 and thus also in the region of the lower withdrawal tank volume region 60.

The tank volume 22 is divided by the two intermediate walls 38, 40 essentially into a first tank volume region 78 also containing the withdrawal tank volume 56 and a second tank volume region 80 essentially comprising the two lateral tank volume regions 30, 32. The first tank volume region 78, which essentially also provides the central tank volume region 42, is connected via recesses 82, 84, 86 formed in the intermediate walls 38, 42 the second tank volume region 80 essentially providing the two lateral tank volume regions 30, 32. Furthermore, a connecting wall 88 extending between the two intermediate walls 38, 40 is provided in the first tank volume region 78, which divides the central tank volume region 80 into regions communicating with one another due to the shape of the connecting wall 88. The connecting wall 88 essentially prevents excessive sloshing movements of the fuel present in the central tank volume region 42 in the machine longitudinal direction L.

To convey fuel present in the fuel tank 20 to a fuel-consuming system region 96, for example a diesel internal combustion engine of the construction machine 11, a fuel withdrawal arrangement generally identified by 90 is provided. This comprises a withdrawal line 94 leading from the lower withdrawal tank volume region 60 to a main fuel pump 92. The fuel is then conveyed by the main fuel pump 92 in the direction toward the fuel-consuming system region 96. The fuel not required therein is fed back into the withdrawal tank volume 56, in particular the lower withdrawal tank volume region 60, via a return feed line 98.

The tank system 18 furthermore comprises a fuel feed arrangement, generally identified by 100. An essential component of the fuel feed arrangement 100 is formed by an auxiliary fuel pump 102, which withdraws fuel from the main tank volume 58, in particular the first tank volume region 78 of the tank volume 22, via a first feed line 104 and feeds this fuel via a fuel filter 106 connected upstream of the auxiliary fuel pump 102 and a second feed line 108 into the withdrawal tank volume 56 in the region of the upper withdrawal tank volume region 68.

The auxiliary fuel pump 102 of the fuel feed arrangement 100 can preferably be permanently operated whenever the main fuel pump 92 of the fuel withdrawal arrangement 90 is also being operated. In this way it is ensured that independently of the inclination positioning of the construction machine 11 or the tank system 18, there is always sufficient fuel present in the withdrawal tank volume 56, in particular in the lower withdrawal tank volume region 60 thereof, so that a state in which the end region of the withdrawal line 94 engaging in the lower withdrawal tank volume region 60 is not immersed in fuel and therefore the main fuel pump 92 would aspirate air, cannot occur. The operation of the auxiliary fuel pump 102 furthermore ensures that the fuel present in the tank volume 22 is continuously circulated, so that on the one hand the settling of contaminants is avoided and on the other hand contaminants carried along during the circulation can be filtered out in the fuel filter 106. Furthermore, this circulation, which is built up during the delivery operation of the main fuel pump 92, ensures that there is constant mixing of the fuel, which is fed back via the return feed line 98 and is generally heated, with fuel present in the fuel tank 20, so that excessive heating, in particular of fuel present in the withdrawal tank volume 56, can be avoided.

A further functional aspect of the fuel feed arrangement 100 is indicated in FIG. 3. Via a valve 110, fuel conveyed by the additional fuel pump 102 from the main tank volume 58 can be conducted not into the withdrawal tank volume 56, but rather in the direction toward the fuel-consuming system region 96, i.e., for example the diesel internal combustion engine. This enables emergency operation when a defect occurs in the region of the main fuel pump 92 and it can no longer be operated to conduct fuel to the diesel internal combustion engine 96. It can then at least be ensured that the construction machine 11 can be moved to a workshop in order to carry out the necessary repairs there.

To fill fuel in the tank volume 22, a filler neck 112 is provided, which provides a filling opening that is open to the lateral tank volume region 32. This lateral positioning of the filler neck 112 prevents mutual interference thereof with system regions arranged centrally on the machine frame 10, for example the diesel internal combustion engine, which can be arranged, for example, so that it is positioned in the rear region of the machine frame 10 above the two intermediate walls 38, 40, so that the intermediate walls 38, 40 can also fulfill a supporting function for the diesel internal combustion engine.

In the above-described tank system, the auxiliary fuel pump 102 can, for example, always be operated when the main fuel pump 92 is also operated. When due to a sufficient fill level, operation of the auxiliary fuel pump 102 is not necessary, for example when with sufficient fill level it is always ensured even with a strongly inclined construction machine that the withdrawal tank volume 56 is filled with fuel, a sensor system can be provided, which supplies sensor signals which can be used as or to provide fill level information. This sensor system can comprise, for example, a fill level sensor 114 which can be seen in FIG. 3 and is arranged in the withdrawal tank volume 56. If this sensor supplies a signal which indicates that only little fuel is contained in the withdrawal tank volume 56, this can be used to put the auxiliary fuel pump 102 into operation by means of an activation unit, which can also receive the signal from the fill level sensor 114. If sufficient fuel is contained in the withdrawal tank volume 56, the auxiliary fuel pump 102 can be deactivated again or can be kept deactivated.

The sensor system, which supplies sensor signals to be used as the basis for fill level information, can alternatively or additionally also comprise an inclination sensor. If this indicates an inclination of a construction machine or the tank system that is above a threshold inclination, the auxiliary fuel pump 102 can thus, for example, be activated independently of the actually present fill level of the tank volume 22, in order to ensure that sufficient fuel is always present in the withdrawal tank volume 56 even in consideration of the circumstance that in operation of the construction machine, the fill level in the tank volume 22 will decrease. In principle, this information about the inclination of a construction machine can also be combined with the information provided by a fill level sensor, for example the fill level sensor 114 shown in FIG. 3, about the fill level in the tank volume 22 or in the withdrawal tank volume 56. If this fill level is below a threshold fill level and if the inclination is above the threshold inclination, the auxiliary fuel pump 102 can be activated to ensure that sufficient fuel is present in the withdrawal tank volume 56.

It is ensured by the construction according to the invention of a tank system for a construction machine that independently of the positioning thereof assumed in working operation of such a construction machine and thus also independently of an inclination of the tank system with respect to a horizontal plane, sufficient fuel is always available in the region from which it is conveyed in the direction toward the fuel-consuming system region. Since in this tank system the tank volume is also delimited in essential regions by an outer shell of a machine frame or a construction machine and thus no further cladding parts or frame parts that externally clad the outer wall of the tank system are provided, efficient utilization of the available space on a construction machine for storing fuel is ensured.

The invention claimed is:

1. A tank system for a construction machine, comprising:
   a fuel tank having a tank outer wall which closes off a tank volume to the outside,
   a withdrawal tank volume separated by a partition wall from a main tank volume of the tank volume and in fuel-exchanging connection with the main tank volume,
   a fuel withdrawal arrangement having a main fuel pump and a withdrawal line opening into the withdrawal tank volume for conveying fuel by the main fuel pump via the withdrawal line from the withdrawal tank volume to a fuel-consuming system region, and
   a fuel feed arrangement having an auxiliary fuel pump for conveying fuel from the main tank volume into the withdrawal tank volume,
   wherein the withdrawal tank volume comprises a lower withdrawal tank volume region in relation to a vertical direction and an upper withdrawal tank volume region adjoining the lower withdrawal tank volume region in the vertical direction, the lower withdrawal tank volume region being separated from the main tank volume in such a way that there is no direct fuel-exchanging connection between the main tank volume and the lower withdrawal tank volume, wherein the lower withdrawal tank volume region is positioned in the vertical direction completely under a bottom wall of the tank outer wall in the region of the main tank volume.

2. The tank system as claimed in claim 1, wherein the withdrawal line opens into the withdrawal tank volume in the region of the lower withdrawal tank volume region.

3. The tank system as claimed in claim 1, wherein the fuel feed arrangement comprises a first feed line opening into the main tank volume and leading from the main tank volume to the auxiliary fuel pump and a second feed line opening into the withdrawal tank volume and leading from the auxiliary fuel pump to the withdrawal tank volume, the auxiliary fuel pump being arranged for feeding fuel from the main tank volume to the withdrawal tank volume via the first feed line and the second feed line.

4. The tank system as claimed in claim 3, wherein the second feed line opens into the withdrawal tank volume in the region of the upper withdrawal tank volume region.

5. The tank system as claimed in claim 3, wherein a fuel filter is arranged in the region of the first feed line.

6. The tank system as claimed in claim 1, wherein the tank volume is divided by at least one intermediate wall into a first tank volume region containing the withdrawal tank volume and a second tank volume region having a fuel-exchanging connection to the first tank volume.

7. The tank system as claimed in claim 3, wherein the tank volume is divided by at least one intermediate wall into a first tank volume region containing the withdrawal tank volume and a second tank volume region having a fuel-exchanging connection to the first tank volume, and wherein the first feed line opens into the main tank volume in the region of the first tank volume region.

8. The tank system as claimed in claim 1, wherein a return feed line opening into the tank volume is provided for feeding back fuel conveyed by the main fuel pump from the withdrawal tank volume into the tank volume, wherein the return feed line opens into the tank volume in the region of the withdrawal tank volume.

9. The tank system as claimed in claim 1, wherein the fuel feed arrangement is designed to feed fuel alternately into the withdrawal tank volume or to the fuel-consuming system region, and/or in that the fuel feed arrangement is designed to permanently operate the auxiliary fuel pump during delivery operation of the main fuel pump.

10. A construction machine comprising a tank system as claimed in claim 1.

11. The construction machine as claimed in claim 10, wherein a part of the tank outer wall provides an outer casing for the construction machine.

12. The construction machine as claimed in claim 10, wherein the tank volume comprises a tank volume region which is central with respect to a machine transverse direction and lateral tank volume regions on both sides of the central tank volume region with respect to a machine longitudinal direction.

13. The construction machine as claimed in claim 12, wherein the tank volume is divided by at least one intermediate wall into a first tank volume region containing the withdrawal tank volume and a second tank volume region having a fuel-exchanging connection to the first tank volume, wherein the central tank volume region is provided by the first tank volume region, and wherein the lateral tank volume regions are provided by the second tank volume region.

14. The construction machine as claimed in claim 12, wherein a filling opening for filling fuel into the tank volume is open to one of the lateral tank volume regions.

15. A method for operating a tank system in a construction machine as claimed in claim 10, wherein the auxiliary fuel pump for conveying fuel from the main tank volume into the withdrawal tank volume is operated when fill level information provided by a sensor system indicates the fill level in the withdrawal tank volume is too low.

* * * * *